United States Patent
Yoo et al.

(10) Patent No.: US 7,085,611 B2
(45) Date of Patent: Aug. 1, 2006

(54) CONTROL METHOD OF PI CONTROLLER

(75) Inventors: Ho-sun Yoo, Seongnam (KR); Jul-ki Seok, Kyungsan (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 224 days.

(21) Appl. No.: 10/634,788

(22) Filed: Aug. 6, 2003

(65) Prior Publication Data

US 2004/0083249 A1    Apr. 29, 2004

(30) Foreign Application Priority Data

Oct. 23, 2002    (KR)    ............ 10-2002-0064851

(51) Int. Cl.
*G05B 13/02*    (2006.01)

(52) U.S. Cl. .................... 700/41; 700/28; 318/609

(58) Field of Classification Search .......... 700/41, 700/28; 318/609–610; 388/906; 706/14
See application file for complete search history.

(56) References Cited

U.S. PATENT DOCUMENTS

| | | | |
|---|---|---|---|
| 3,946,297 A * | 3/1976 | Bechtel ............... | 318/609 |
| 4,600,870 A * | 7/1986 | Martin ............... | 318/610 |
| 4,743,822 A * | 5/1988 | Futami et al. ......... | 318/610 |
| 4,754,391 A | 6/1988 | Suzuki | |
| 5,157,597 A * | 10/1992 | Iwashita ............. | 700/37 |
| 5,742,503 A * | 4/1998 | Yu ................... | 700/42 |
| 6,198,246 B1 | 3/2001 | Yutkowitz | |
| 6,326,758 B1 * | 12/2001 | Discenzo ............. | 318/609 |
| 6,366,049 B1 * | 4/2002 | Chen et al. ........... | 318/799 |
| 6,822,415 B1 * | 11/2004 | Komiya et al. ........ | 318/629 |
| 2003/0153990 A1 * | 8/2003 | Boiko ................ | 700/37 |

FOREIGN PATENT DOCUMENTS

| | | |
|---|---|---|
| JP | 63-101901 | 5/1988 |
| JP | 02-10197 | 1/1990 |
| JP | 07-036504 | 2/1995 |
| JP | 08-16205 | 1/1996 |
| JP | 09-088685 | 3/1997 |
| JP | 11-276724 | 10/1999 |
| JP | 2000-035119 | 2/2000 |
| KR | 0160714 | 3/1997 |

OTHER PUBLICATIONS

Tan et al—"Robust Self-Tuning PID Controller for Nonlinear Systems" —IECON'01 —The 27th Annual Conference of the IEEE Industrial Electronics Society —2001, pp. 758-763.*

(Continued)

*Primary Examiner*—Albert W. Paladini
*Assistant Examiner*—Alexander Kosowski
(74) *Attorney, Agent, or Firm*—Staas & Halsey LLP (57) ABSTRACT

A control method of a PI controller which selectively performs a proportional control and a proportional/integral control, the method includes Fourier transforming an output of the PI controller, calculating a spectral energy ratio of the transformed output of the PI controller of at a reference frequency for all frequency regions, performing the proportional control in response to the calculated spectral energy ratio exceeding a predetermined reference ratio, and the proportional/integral control in response to the spectral energy ratio being the predetermined reference ratio or less. Accordingly, a PI controller utilizing the method can easily detect a switching point between a proportional control and a proportional/integral control, independent of species and states of a system thereof.

26 Claims, 4 Drawing Sheets

OTHER PUBLICATIONS

Swiniarski —"Neural Network Based Self-Tuning PID Controller with Fourier Transformation of Temporal Patterns" —IEEE, 1990. pp. 1227-1232.*

Japanese Office Action mailed May 18, 2006 in Japanese Patent Application No.: 2003-332273.

* cited by examiner

CONTROL METHOD OF PI CONTROLLER

CROSS-REFERENCE TO RELATED APPLICATIONS

This application claims the benefit of Korean Application No. 2002-64851, filed Oct. 23, 2002, in the Korean Intellectual Property Office, the disclosure of which is incorporated herein by reference.

BACKGROUND OF THE INVENTION

1. Field of the Invention

The present invention relates to a control method of a PI controller, and more particularly, to a control method of a PI controller, the method comprising detecting a switching point between a P control and a PI control by analyzing a frequency feature of a driving part.

2. Description of the Related Art

Generally, a highly advanced motor control technology has been applied to an industrial robot or a machine tool to improve their performance. A control system of this motor control technology uses a PI controller (proportional/integral controller) having a combination form of a P controller (Proportional controller) and an I controller (Integral controller).

This PI controller selectively performs a P control (proportional control) or a PI control (proportional/integral control) according to characteristics of a driving part controlled thereby. In a transient state, performing the P control makes a response time short and minimizes an occurrence of a response oscillation. Also, in a steady state, performing the PI control prevents an occurrence of an excessive overshoot and improves characteristics of the steady state of the system, such as a decrease of a steady state error and an improvement of stability.

In this conventional PI controller, a switching point between the P control and the PI control, that is a separating point between the transient state and the steady state, is determined according to whether values of reference variables, such as a velocity error, a velocity order, a position error and a torque order of the system, are within reference values.

However, in a method of detecting the switching point of the conventional PI controller, a process to select the reference variables and detect the size of the reference values of the reference variables is differently applied to each system. Consequently, the reference variables and the reference values need to be respectively determined in each system.

Additionally, in the case of a same system, the reference Variables and the reference values applied to a specific operation state are not applied optimally to an other state of the same system.

Furthermore, the reference values and the reference variables are typically determined through many trial and errors, necessarily requiring a dependence on an experienced operator.

SUMMARY OF THE INVENTION

Accordingly, it is an aspect of the present invention to provide a control method of a PI controller that can easily detect a switching point between a P control and a PI control, independent of a type and states of a system.

Additional aspects and advantages of the invention will be set forth in part in the description which follows and, in part, will be obvious from the description, or may be learned by practice of the invention.

To achieve the above and/or other aspects of the invention, there is provided a control method of a PI controller which selectively performs a proportional control and a proportional/integral control, the method comprising Fourier transforming an output of the PI controller, calculating a spectral energy ratio of the transformed output of the PI controller at a reference frequency for all frequency regions, and performing the proportional control in response to the calculated spectral energy ratio exceeding a predetermined reference ratio, and the proportional/integral control in response to the spectral energy ratio being equal to the predetermined reference ratio or less.

The reference frequency may include a corner frequency in a frequency response of a driving part controlled by the controller.

The corner frequency may satisfy the following relationship:

$$f_T = \frac{Bm}{Jm}$$

in response to a transfer function (G(s)) of the driving part being $$\frac{1}{Jm \times s + Bm},$$

where $B_m$ and $J_m$ are friction and inertia affecting the driving part, respectively.

The Fourier transforming of the output may comprise discrete Fourier transforming the output of the PI controller.

The Fourier transforming of the output may comprise fast Fourier transforming of the output of the PI controller.

The spectral energy ratio (R) may satisfy the following relationship:

$$R = \int_{wc}^{\infty} |X(k)|^2 dw \bigg/ \int_{0}^{\infty} |X(k)|^2 dw, k = 0, 1, 2$$

where $W_c$ is the reference frequency and X(k) is a Fourier transform in an Nth period of the output of the PI controller.

BRIEF DESCRIPTION OF THE DRAWINGS

These and/or other aspects and advantages of the present invention will become apparent and more readily appreciated from the following description of preferred embodiments, taken in conjunction with the accompany drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

Although the present invention is, by way of example, applied to a Servo system, it is understood that the application of the present invention is not limited to the servo system.

Figure 1:
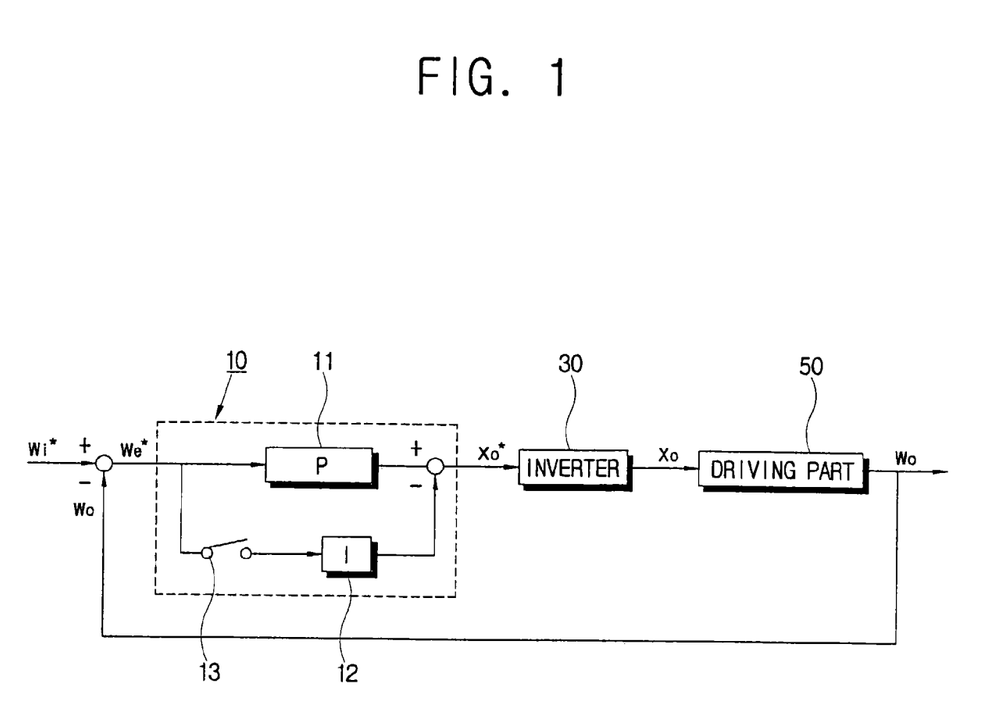
FIG. 1 is a control block diagram of a system having a PI controller according to an embodiment of the present invention.

FIG. 1 shows a control block diagram of a system having a PI controller according to an embodiment of the present invention. As shown FIG. 1, where an order value ($\omega_i^*$) of a velocity to control a driving part 50, for example, a motor, is input to the system, the driving part 50 is controlled to reach the velocity. An output value ($\omega_o$) of the driving part 50 is fed back and subtracted from the velocity order value ($\omega_i^*$) to create a velocity error value ($\omega_e^*$). The velocity error value ($\omega_e^*$) is multiplied by a proportional gain or a proportional gain and integral gain by a proportional/integral controller 10 (PI controller) to be transformed into a torque order value ($x_o^*$), and the torque order value ($x_o^*$) is transformed into an analog signal ($x_o$) through an inverter 30 and then input to the driving part 50.

The PI controller 10 performs a proportional control by a proportional controller (P controller) 11, and a proportional/integral control by a composition of the P controller 11 and an integral controller (I controller) 12. A switching between the proportional control and the proportional/integral control is performed by a switching part 13 which switches on/off a flow of the velocity error value ($\omega_e^*$) into the I controller 12. That is, in the case that the switching part 13 is off, the PI controller 10 performs the proportional control, and in the case that the switching part 13 is on, the PI controller 10 performs the proportional/integral control.

A switching point between the proportional control and the proportional/integral control of the PI controller 10 according to the present invention is detected by, for example, analyzing frequency characteristics of an output of the PI controller 10 as follows.

Before detecting the switching point of the PI controller 10, the driving part 50, which is controlled by the PI controller 10, is assumed to be a primary system. For example, in the case that the driving part 50 is a motor, assuming that a mechanical system of the motor is affected only by inertia (Jm) and friction (Bm), a transfer function (G(s)) of the motor is defined as the following equation (1).

$$G(s) = \frac{1}{Jm \times s + Bm} \quad (1)$$

Figure 2:
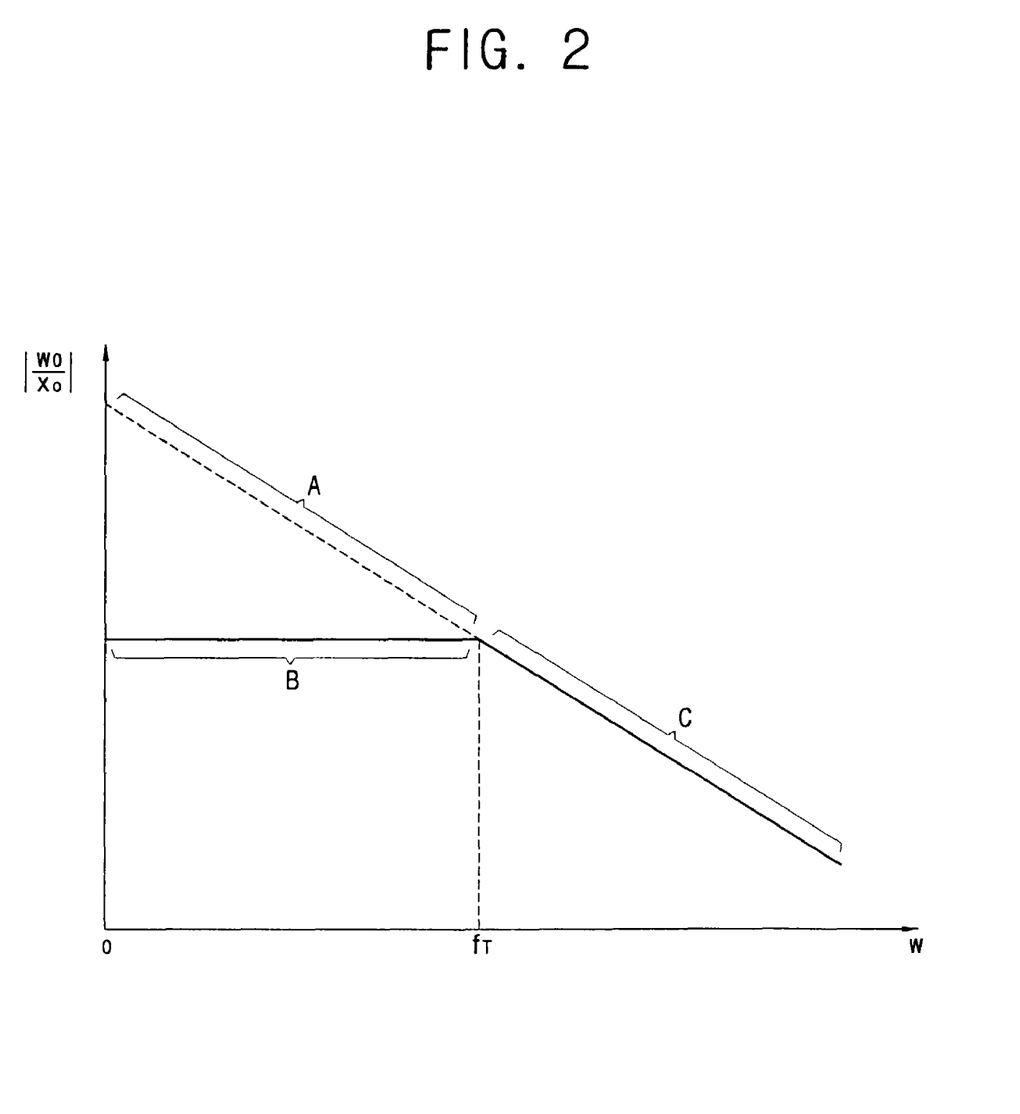
FIG. 2 is a graph illustrating a gain curve in the Bode diagram for a frequency response of a driving part of FIG. 1.

FIG. 2 shows a graph illustrating a gain curve in the Bode diagram for a frequency response of the driving part 50. In FIG. 2, a curve shown as a solid line (in "B" and "C" sections) represents a gain curve for the frequency response of the driving part 50, and a dotted line (in "A" section) represents a gain curve for the frequency response where the transfer function of the driving part 50 is $$\frac{1}{Jm \times s}.$$

As shown in FIG. 2, in a low frequency region (0-$f_T$), response characteristics of the driving part 50 are highly affected by a friction factor ($B_m$), and in a high frequency region ($f_T$-∞), the response characteristics of the driving part 50 are almost similar to characteristics of a system $$\left(\frac{1}{Jm \times s}\right)$$

having only inertia (Jm). That is, in the high frequency region ($f_T$-∞), characteristics of the driving part 50 include characteristics of an I controller. Accordingly, in the case of controlling the driving part 50 in the high frequency region ($f_T$-∞), an intended output of the driving part 50 is induced only by the proportional control. Herein, a reference frequency dividing the low frequency region and the high frequency region is a corner frequency ($f_T$) on the Bode diagram. The corner frequency ($f_T$) is calculated by the following equation (2) where the transfer function (G(s)) is the equation (1) above.

$$f_T = \frac{Bm}{Jm} \quad (2)$$

According to the present invention, to detect the switching point of the PI controller 10 in a time region corresponding to the corner frequency ($f_T$), a spectrum analysis is applied to an output ($X_e^*(n)$) of the PI controller 10.

Assuming that the output ($X_e^*(n)$) of the PI controller 10 calculated in every control period is a discrete signal and a series of non-periodical values, the discrete Fourier transform (DFT) may be utilized. A frequency spectrum (X(k)) in an Nth period is defined as the following equation (3).

$$X(k) = \sum_{n=0}^{N-1} x_e(n) W_N^{nk}, \; 0 \leq k \leq N-1, \; W_N = e^{-j\frac{2\pi}{N}} \quad (3)$$

Herein, instead of the DFT, a fast Fourier transform (FFT) can be used to improve an operation speed. An operation method by the FFT is already disclosed and thus a description thereof is not further provided.

A spectral energy of the output of the PI controller for the reference frequency calculated by the Fourier transform is defined as the following equation (4).

$$R_{wc} = \int_{wc}^{\infty} |X(k)|^2 dw, \; k = 0, 1, 2 \quad (4)$$

Where the frequency spectrum (X(k)) for the output ($X_e^*(n)$) of the PI controller 10 is calculated by the method described above, a spectral energy ratio (R) in the reference frequency ($w_c$) for all the frequencies in every control period is calculated by the following equation (5).

$$R = Rwc \bigg/ \int_0^\infty |X(k)|^2 dw, k = 0, 1, 2 \qquad (5)$$

or, $$R = \int_{wc}^\infty |X(k)|^2 dw \bigg/ \int_0^\infty |X(k)|^2 dw, k = 0, 1, 2$$

In the case that the spectral energy ratio (R) calculated by the equation 5 exceeds a predetermined reference ratio, the driving part 50 is regarded as in a state where an output signal of the PI controller 10 contains relatively large-high-frequency component, that is, in a transient state and thus proportional control is performed. On the other hand, in the case that the spectral energy ratio (R) is equal to or less than the predetermined reference ratio, the driving part 50 is regarded as in a state where the output signal of the PI controller 10 contains a relatively large low-frequency component, that is, in a steady state and thus the proportional/integral control is performed.

On the basis of the spectral energy ratio (R) calculated by the method described above, FIG. 3 shows a process to control the PI controller 10 according to the present invention.

Figure 3:
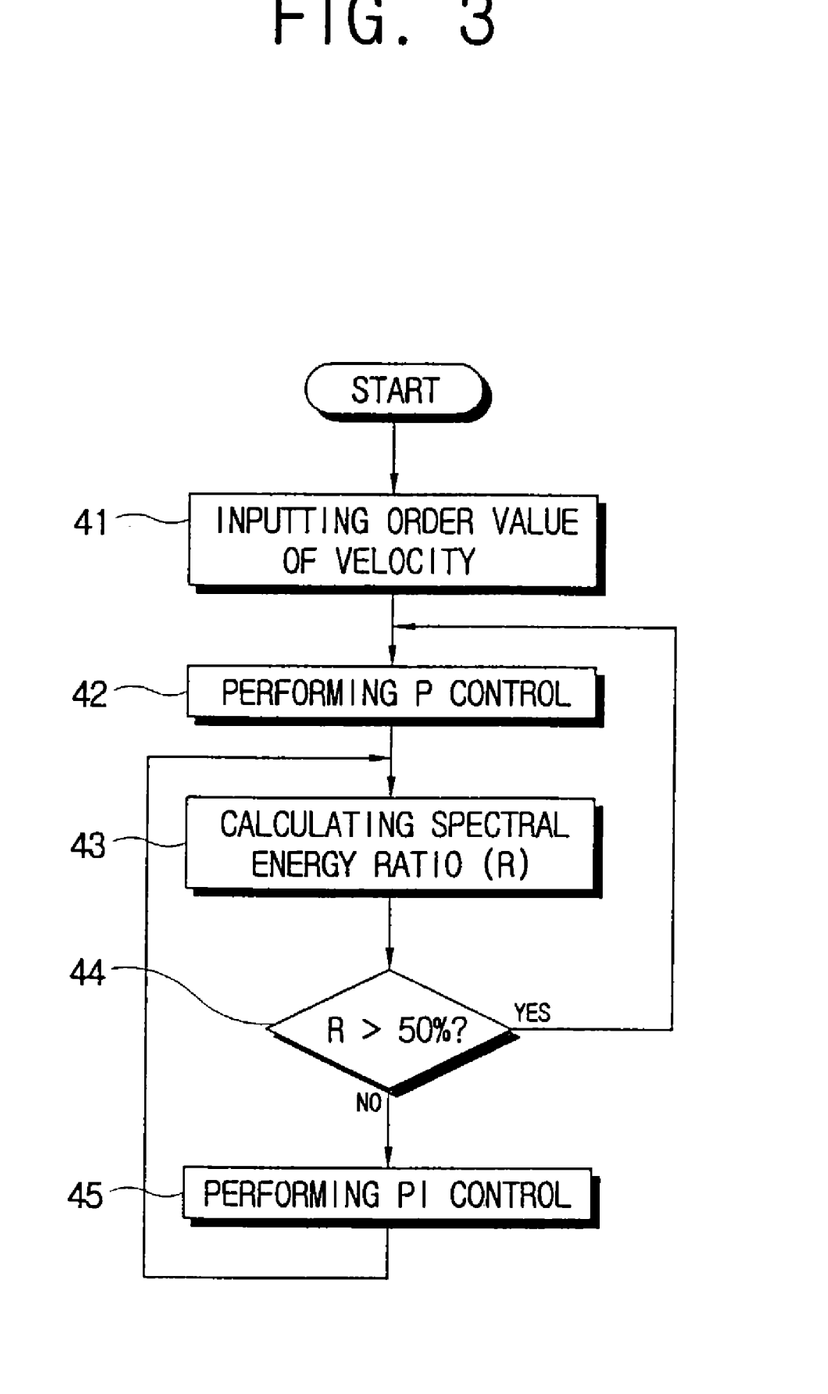
FIG. 3 is a flow diagram illustrating a control method of a PI controller according to the present invention.

In operation 41, the velocity order value $W_i^*$ is applied to the system to operate the driving part 50. In operation 42, the proportional control is performed in an initial transient state of the system. In operation 43, the spectral energy ratio (R) at the reference frequency ($w_c$) for all the frequencies in every control period is calculated by the method described above.

In operation 44, the calculated spectral energy ratio (R) and the predetermined reference ratio are compared, and the switching point of the proportional control and the proportional/integral control is detected. Herein, in the case that the reference ratio is set as 50%, where the calculated spectral energy ratio (R) exceeds 50%, the proportional control is performed by proceeding to the operation 42. Where the spectral energy ratio (R) is 50% or less, the proportional/integral control is performed in operation 45. The switching between the proportional control and the proportional/integral control is performed by, for example, an on/off operation of the switching part 13 as described above.

Figure 4A:
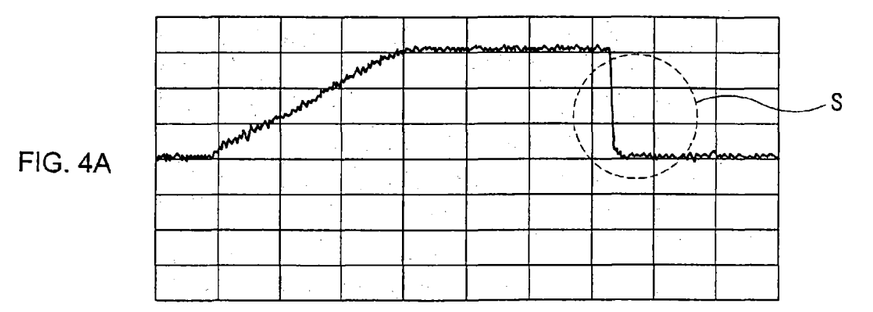
FIGS. 4A–4C are graphs illustrating response curves of a conventional PI controller and the PI controller according to the present invention, for a same velocity order signal.
Figure 4B:
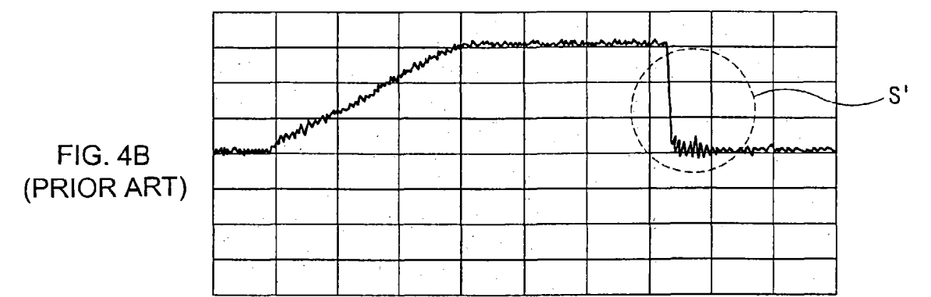
Figure 4C:
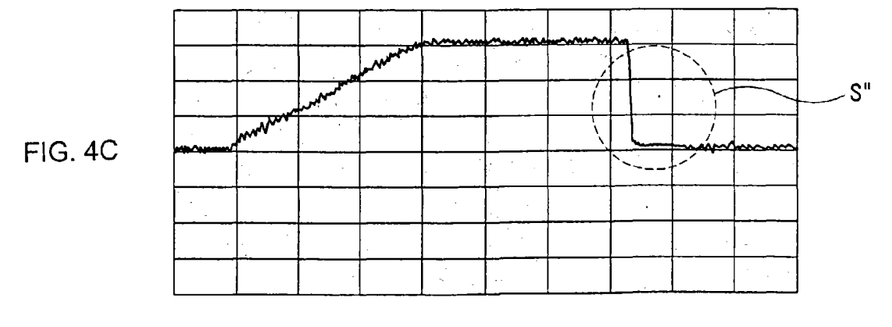

FIG. 4A shows a graph illustrating a velocity order signal that is applied to a system. FIG. 4B shows a graph illustrating a response curve of a system having a PI controller which performs a control with a conventional switching point detecting method for the same velocity order signal. FIG. 4C shows a graph illustrating a response curve of a system having the PI controller 10 which performs a control with the method of detecting the switching point, according to the present invention, for the same velocity order signal.

In the case of the conventional PI controller, where a driving part is slowly accelerated, reference variables and reference values are installed to gain an optimum response, and thus a switching point is detected. In a region where a motor is slowly accelerated, a response effectively follows the velocity order signal, but in a region where the motor is hastily decelerated (S), response characteristics go bad (s'). On the contrary, in the case of the PI controller 10 according to the present invention, the response in the haste deceleration and the response in the slow acceleration effectively follow the velocity order signal. Accordingly, the PI controller 10 according to the present invention controls the system to have effective response characteristics, independent of the state of the system.

In the embodiment described above, although the reference ratio is installed as 50%, it is understood that an operator may optionally set a different reference ratio. The reference ratio may be installed approximately between 30% and 70%.

As described above, the present control method includes Fourier transforming the output of the PI controller and detecting the switching point between the proportional control and the proportional/integral control by analyzing the spectral energy of the transformed output of the PI controller for the predetermined reference frequency. Accordingly, the switching point between the proportional control and the proportional/integral control is easily detected, independent of species and states of the system.

As a result, a PI controller that can easily detect a switching point between a proportional control and a proportional/integral control, independent of species and states of a system, can be provided by utilizing the present invention.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A control method of a PI controller which selectively performs a proportional control and a proportional/integral control, the method comprising:

Fourier transforming an output of the PI controller;

calculating a spectral energy ratio of the transformed output of the PI controller at a reference frequency for all frequency regions; and performing the proportional control in response to the calculated spectral energy ratio exceeding a predetermined reference ratio, and the proportional/integral control in response to the calculated spectral energy ratio being equal to the predetermined reference ratio or less.

2. The control method of the PI controller according to claim 1, wherein the reference frequency includes a corner frequency in a frequency response of a driving part controlled by the PI controller.

3. The control method of the PI controller according to claim 2, wherein the corner frequency $f_T$ satisfies the following relationship:

$$f_T = \frac{Bm}{Jm}$$

in response to a transfer function (G(s)) of the driving part being $$\frac{1}{Jm \times s + Bm},$$

where $B_m$ and $J_m$ are friction and inertia affecting the driving part, respectively.

4. The control method of the PI controller according to claim 2, wherein the Fourier transforming of the output comprises discrete Fourier transforming the output of the PI controller.

5. The control method of the PI controller according to claim 2, wherein the Fourier transforming of the output comprises fast Fourier transforming the output of the PI controller.

6. The control method of the PI controller according to claim 4, wherein the spectral energy ratio (R) satisfies the following relationship:

$$R = \int_{w_c}^{\infty} |X(k)|^2 dw \bigg/ \int_{0}^{\infty} |X(k)|^2 dw, k = 0, 1, 2 \ldots$$

where $W_c$ is the reference frequency and $X(k)$ is a Fourier transform in an Nth period of the output of the PI controller.

7. The control method of the PI controller according to claim 5, wherein the spectral energy ratio (R) satisfies the following relationship:

$$R = \int_{w_c}^{\infty} |X(k)|^2 dw \bigg/ \int_{0}^{\infty} |X(k)|^2 dw, k = 0, 1, 2 \ldots$$

where $W_c$ is the reference frequency and $X(k)$ is a Fourier transform in an Nth period of the output of the PI controller.

8. The control method of the PI controller according to claim 4, wherein the output of the PI controller in every control period is a discrete signal and a series of non-periodic values.

9. The control method of the PI controller according to claim 2, further comprising:
applying a velocity order value to operate the driving part; and
performing the proportional control in an initial transient state of the driving part.

10. A control method of a PI controller which selectively performs a proportional control and a proportional/integral control, the method comprising:
Fourier transforming an output of the PI controller; and
detecting a switching point between the proportional-control and the proportional/integral control by analyzing a spectral energy of the transformed output of the PI controller for a reference frequency.

11. The method according to claim 10, further comprising:
calculating a spectral energy ratio of the transformed output of the PI controller at the reference frequency for all frequency regions;
performing the proportional control in response to the calculated spectral energy ratio exceeding a predetermined reference ratio, and the proportional/integral control in response to the calculated spectral energy ratio being equal to the predetermined reference ratio or less.

12. The method according to claim 11, wherein the reference frequency includes a corner frequency in a frequency response of a driving part controlled by the PI controller.

13. The method according to claim 12, wherein the corner frequency $f_T$ satisfies the following relationship:

$$f_T = \frac{Bm}{Jm}$$

in response to a transfer function (G(s)) of the driving part being $$\frac{1}{Jm \times s + Bm},$$

where $B_m$ and $J_m$ are friction and inertia affecting the driving part, respectively.

14. The method according to claim 12, wherein the spectral energy ratio (R) satisfies the following relationship:

$$R = \int_{w_c}^{\infty} |X(k)|^2 dw \bigg/ \int_{0}^{\infty} |X(k)|^2 dw, k = 0, 1, 2 \ldots$$

where $W_c$ is the reference frequency and $X(k)$ is a Fourier transform in an Nth period of the output of the PI controller.

15. A PI controller which selectively performs a proportional control and a proportional/integral control, comprising:
a proportional controller;
an integral controller; and
a switching part which switches the integral controller on/off, wherein the PI controller performs one of the proportional control and the proportional/integral control according to a spectral energy of a Fourier transformed output of the PI controller for a reference frequency.

16. The PI controller according to claim 15, wherein the PI controller performs the proportional control where a spectral energy ratio of the Fourier transformed output, which is calculated at the reference frequency for all frequency regions, exceeds a predetermined reference ratio, and performs the proportional/integral control where the spectral energy ratio is equal to the predetermined reference ratio or less.

17. The PI controller according to claim 16, wherein the reference frequency includes a corner frequency in a frequency response of a driving part controlled by the PI controller.

18. The PI controller according to claim 17, wherein the corner frequency $f_T$ satisfies the following relationship:

$$f_T = \frac{Bm}{Jm}$$

in response to a transfer function (G(s)) of the driving part being $$\frac{1}{Jm \times s + Bm},$$

where $B_m$ and $J_m$ are friction and inertia affecting the driving part, respectively.

19. The PI controller according to claim 17, wherein the spectral energy ratio (R) satisfies the following relationship:

$$R = \int_{w_c}^{\infty} |X(k)|^2 dw \bigg/ \int_0^{\infty} |X(k)|^2 dw, k = 0, 1, 2$$

where $W_c$ is the reference frequency and $X(k)$ is a Fourier transform in an Nth period of the output of the PI controller.

20. A driving system comprising:

a driving part;

a PI controller which selectively performs a proportional control and a proportional/integral control of the driving part according to a spectral energy of a Fourier transformed output of the PI controller for a reference frequency.

21. The driving system according to claim 20, wherein the PI controller performs the proportional control where a spectral energy ratio of the Fourier transformed output, which is calculated at the reference frequency for all frequency regions, exceeds a predetermined reference ratio, and performs the proportional/integral control where the spectral energy ratio is equal to the predetermined reference ratio or less.

22. The driving system according to claim 20, wherein:

the reference frequency includes a corner frequency in a frequency response of the driving part controlled by the PI controller, and the corner frequency $f_T$ satisfies the following relationship:

$$f_T = \frac{Bm}{Jm}$$

in response to a transfer function (G(s)) of the driving part being $$\frac{1}{Jm \times s + Bm},$$

where $B_m$ and $J_m$ are friction and inertia affecting the driving part, respectively.

23. The driving system according to claim 20, wherein the spectral energy ratio (R) satisfies the following relationship:

$$R = \int_{w_c}^{\infty} |X(k)|^2 dw \bigg/ \int_0^{\infty} |X(k)|^2 dw, k = 0, 1, 2 \ldots$$

where $W_c$ is the reference frequency and $X(k)$ is a Fourier transform in an Nth period of the output of the PI controller.

24. The driving system according to claim 20, further comprising an inverter which receives a torque order value signal of the PI controller, transforms the torque order value into an analog signal, and outputs the analog signal to the driving part.

25. The driving system according to claim 20, wherein the PI controller detects a switching point between the proportional control and the proportional/integral control, independent of species and states of the system.

26. A PI controller which selectively performs a proportional control and a proportional/integral control, comprising:

a proportional controller;

an integral controller; and a switching part which switches the integral controller on/off, wherein the PI controller determines a switching point between the proportional control and the proportional/integral control, independent of species and states of a system having the PI controller, according to a spectral energy of a Fourier transformed output of the PI controller for a reference frequency.

* * * * *

UNITED STATES PATENT AND TRADEMARK OFFICE
CERTIFICATE OF CORRECTION

PATENT NO.        : 7,085,611 B2                                             Page 1 of 1
APPLICATION NO.   : 10/634788
DATED             : August 1, 2006
INVENTOR(S)       : Ho-sun Yoo et al.

It is certified that error appears in the above-identified patent and that said Letters Patent is hereby corrected as shown below:

On the cover page; item

(56) References Cited, Other Publications, change "Tan et al" to --Tan et al.--

Col. 7, lines 41-42, change "proportional-control" to --proportional control--

Col. 9, lines 4, change after "0,1,2" insert --…--

Signed and Sealed this

Second Day of January, 2007

JON W. DUDAS
*Director of the United States Patent and Trademark Office*